Patented July 20, 1937

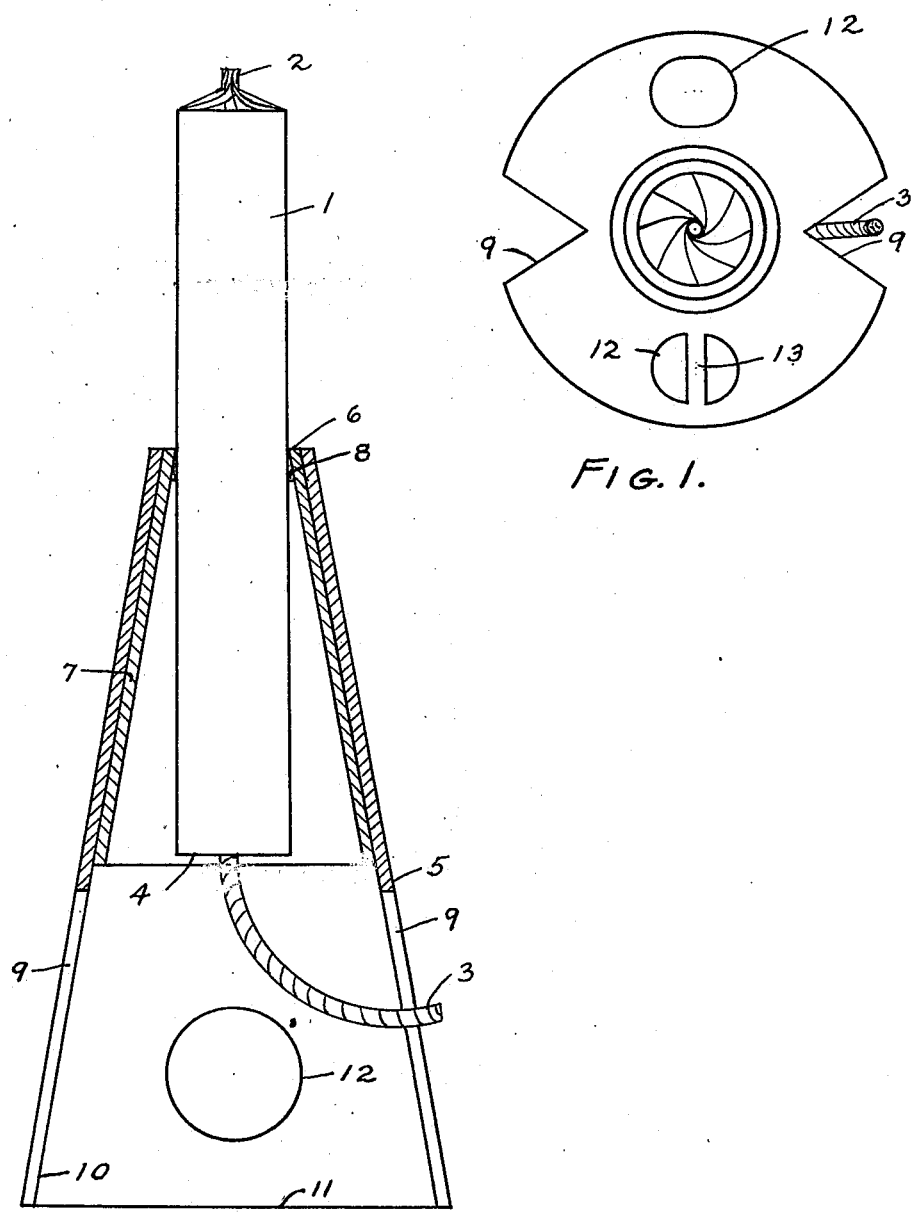

2,087,281

UNITED STATES PATENT OFFICE 2,087,281

STICKLESS SKYROCKET

Achillo Fabrizio, Havre de Grace, Md.

Application December 15, 1936, Serial No. 116,031

4 Claims. (Cl. 102—23)

This invention refers to fireworks and more particularly to the class known as rockets. It has among its objects to provide a rocket that will be relatively safe and more direct in its flight; to provide a rocket that will be stickless; and to provide a rocket that may be safely packed, and its firework body proper protected in transit, if desired. A further object is to have the rocket arranged to demolish completely and thereby avoid the possibility of injuring observers or others with sticks and other hard objects descending from the exploded rockets. A still further object is to provide a magnifying action to the explosion. Other objects include the provision of a conspicuous looking firework; a tone control; a stable article that will support itself without attaching it in the ground; that does not require firing troughs; that will use the full power of the powder when the firework is set off to propel it through the atmosphere; that may be handled without direct touching of the firework body proper, and many other objects that will become apparent as the invention is more fully set forth.

Rocket fireworks have usually been made with sticks of wood or metal attached, to support them off the ground and give the necessary tail to guide them in their flight. The sticks are thrown away from the rockets when they explode in the air and at times fall on bystanders. Injuries have been caused by these falling sticks, but because of the difficulty of getting the rockets to work without them, they have been kept in use, trusting to chance that accidents would be avoided. In other cases wings have been attached to the sides of the rocket body proper and have served to direct the rocket upwardly but have the disadvantage of errantly directing the rocket in its flight if one of the wings becomes slightly bent out of line, or becomes loosened or disengaged during its upward travel, from which serious injury results.

In this invention, the rocket body proper is inserted through an apex hole in a cone-like holder and projects beyond same sufficiently to provide the pointed end and balance the rocket in flight. The cone-like holder serves as a base for supporting the firework in a vertical position. The latter is provided with slots or holes to assist the rocket in its flight and attractiveness, as well as permit easy access to the fuse. The holder being connected to the firework itself directly is completely demolished when the latter explodes in the air, leaving nothing to injure the bystanders.

This arrangement avoids the use of wings and sticks and, therefore, cannot fly erratically, since its cone form is more substantially constructed, it has no projecting wings or lips to be misaligned. The slots and holes are arranged to suit the purposes of the rocket and to emit sounds and other predetermined effects which are required of it.

In the drawing, which shows an embodiment of this invention, by way of example:

Figure 1 is a plan view of a rocket firework embodying the invention.

Figure 2 is a sectional elevation of the rocket firework shown in Figure 1 showing the general construction of the device.

Similar reference characters refer to similar parts throughout the drawing.

In the construction, 1 represents a conventional form of firework rocket body with its top 2 twisted into a helical point, and a fuse 3 inserted and attached at the bottom portion 4, as indicated. The fuse discharges the powder in the interior of the rocket casing and starts the rocket into flight. The rocket body is inserted into a hollow holder 5, which is preferably of paper or cardboard stock of conical or pyramidical form. It passes through an apexed orifice 6 in same which holds it tightly. An inner conical or pyramidical liner or sleeve 7 being disposed in the apexed portion of the holder 5 to reinforce and weight same, as required. The orifice of same being the portion tightly securing the rocket body in place, in such cases. Glue or similar fastening means 8, is preferably used to permanently attach the parts together when such is desirable. The holder, at its enlarged portion 10, is provided with orifices or slots 9 preferably of V-like form as indicated in the drawing, which open on the peripheral line 11 of the base and become apexed about half-way up the holder. Holes or orifices 12 are provided in the holder as shown and may be provided with sound producing devices 13 to provide a suitable tone or whistle to the firework on its flight through the air. These holes also serve to modify the action of the rocket in its flight. The holder, as formed, forms an explosion chamber for the discharges of the rocket.

In transporting the firework, the rocket body proper may be pushed back into the holder so as to protect it and conserve space, and if desired the parts can be packed separately. The rocket body is quickly positioned into operative position in its holder.

In the operation of the rocket, the device with its holder in the proper relative position, is first set on the ground or surface from which it is to be discharged. When set in position, the fuse 3 has its end portion bent towards one of the slots 9, or holes 12, to provide a convenient lighting arrangement for the operator to set it off. After the fuse is lit, it burns brightly, because it is off the ground, has ample air for combustion in the chamber provided within the holder, and the walls of the holder protect it from winds and the elements. When the powder is reached by the burning fuse, the explosion thereof, blows down into the chamber, the walls of which guide the gases down directly to the surface of the ground with practically no leakage of power. As the rocket passes through the air in its flight, the conical form cuts through same effectively and in a straight line towards its predetermined objective. The explosions of the rocket passing into the holder, which is like a megaphone in form, are conserved within the space of the walls of the same, and exert full pressure and expansion against the atmosphere, so that the effective moving force is more efficient than in forms of rockets having unrestricted explosion exhaustings. This makes the rocket act with louder action and have greater effective range. When the peak of the flight is reached, the rocket explodes and completely demolishes.

In its travel through the air, the orifices in the holder produce a back draft which serves to keep the rocket in a straight line. The flow of air through the holes in the wall of the holder serves to guide the rocket in its travel and to produce a tone or whistle which can be more or less accentuated with the musical means provided in connection therewith. In the use of this type of firework the sound effects are often of considerable importance and interest to the bystanders, and this method provides for an effective way of providing the same result without the addition of expensive devices or construction that would be otherwise necessary.

When the firework makes its last explosion, the megaphone form of the holder amplifies the detonation to the observers, instead of the unrestrained open explosion that otherwise would take place, which sounds much weaker. The holder has a carrying power of its own which is not mitigated by the air through which it flies, and has capacity to carry such ornamental or other features which might seem desirable to add for occasions, and without appreciably affecting its flight or efficiency.

While but one form of the invention is indicated in the drawing, it is not desired to limit this application for patent to this particular form, or in any way not limited by the prior art, as it is appreciated that other forms of construction could be made that would use the same principles and come within the scope of the appended claims.

Having thus described the invention, what is claimed is:

1. A rocket of the class described comprising in combination, a rocket body with a twisted head and a rear fuse, a hollow holder having an open rear, and means for securing the holder and rocket body together and positioning the said rocket whereby its explosions will be directed through the body and out of the open rear and restricted in propulsion area, said holder being provided with a plurality of openings for affecting the flight of the rocket through the atmosphere.

2. A rocket of the class described comprising in combination, a rocket body with a twisted head and a rear fuse, a hollow holder having an open rear, and means for securing the holder and rocket body together and positioning the said rocket whereby its explosions will be directed through the body and out of the open rear and restricted in propulsion area, said holder being provided with a plurality of openings for effecting the flight of the rocket through the atmosphere, and means for controlling the musical tone of the rocket in its flight.

3. A stickless firework rocket having a conventional rocket body, a funnel shaped holder for the rocket body and attached thereto for controlling the flight thereof, and a plurality of orifices in the holder, arranged to predeterminedly affect the directional flight and explosive action of the rocket.

4. A stickless firework rocket having a conventional rocket body, a funnel shaped holder for the rocket body and attached thereto for controlling the flight thereof, and a plurality of orifices in the holder, arranged to predeterminedly affect the directional flight and explosive action of the rocket, means for affecting the musical tone of the rocket in its flight acting in cooperation with said orifices, and means for permanently securing the exterior wall of the said body to the interior surface of said holder.

ACHILLO FABRIZIO.